I. E. WORK.
PIPE.
APPLICATION FILED FEB. 23, 1912.
1,071,197.
Patented Aug. 26, 1913.
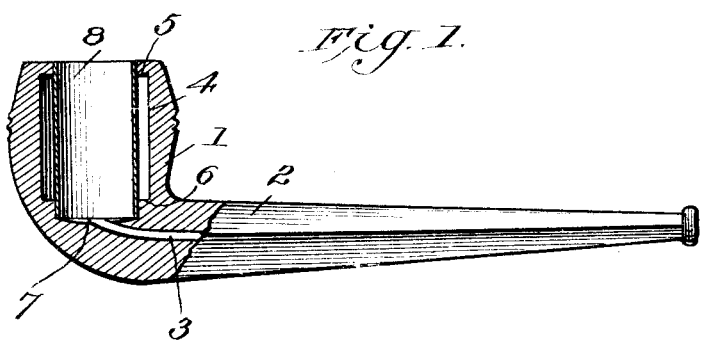
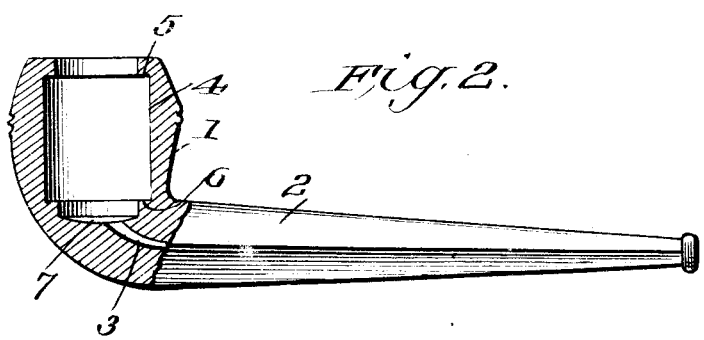
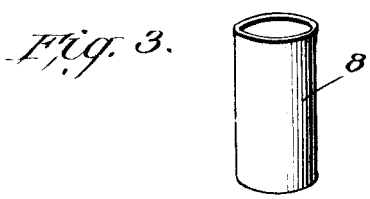
Inventor
Irby E. Work
Witnesses
Edward P. Rea
Juana M. Fallin
By A. W. Facey, Attorney.

UNITED STATES PATENT OFFICE.

IRBY E. WORK, OF ST. LOUIS, MISSOURI.

PIPE.

1,071,197.  Specification of Letters Patent.  Patented Aug. 26, 1913.

Application filed February 23, 1912. Serial No. 679,337.

*To all whom it may concern:*

Be it known that I, IRBY E. WORK, citizen of the United States, residing at St. Louis, in the State of Missouri, have invented certain new and useful Improvements in Pipes, of which the following is a specification.

This invention relates to smokers' pipes and aims to provide a pipe the bowl of which will be kept cool by a surrounding air jacket so that the smoke from the burning tobacco in the bowl will be comparatively cool when it reaches the smoker's mouth.

The invention contemplates the provision of a pipe having the wall of its bowl interiorly recessed so as to form upper and lower flanges, and a shell which is fitted removably in the bowl and held spaced from the wall thereof between said flanges so as to form between the flanges and between the shell and the wall of the bowl, an air jacket surrounding the shell.

A feature of the invention resides in having the shell removable so that it may be thoroughly cleaned when desired.

For a full understanding of the invention reference is to be had to the following description and accompanying drawings, in which:—

Figure 1 is a view partly in longitudinal section and partly in elevation of a pipe constructed in accordance with the present invention. Fig. 2 is a similar view, the shell of the bowl being removed. Fig. 3 is a perspective view of the shell.

Corresponding and like parts are referred to in the following description and indicated in all the views of the accompanying drawing by the same reference characters.

In the drawing, the bowl of the pipe is indicated by the numeral 1 and the stem by the numeral 2, the latter being formed with the usual smoke passage 3. The bowl and stem are preferably integral and may be cast from aluminum or other suitable metal or may be fashioned from wood.

The bowl 1 has its wall formed interiorly with a recess 4, the said wall being preferably cylindrical and the recess extending entirely therearound. This recess also extends substantially throughout the entire height of the wall and results in the formation of a flange 5 at the top of the bowl and a flange 6 at the bottom thereof, these flanges projecting inwardly, as illustrated in Figs. 1 and 2 of the drawing. The smoke passage opens into a depression 7 in the bottom of the bowl 1 and the flange 6 surrounds this depression 7.

As before stated, the invention contemplates providing an air jacket for the bowl and for this purpose a thin cylindrical shell 8, preferably of the same material as the bowl of the pipe and open at both ends is fitted into the bowl and is surrounded at its upper and lower ends by the flanges 5 and 6, respectively. These flanges serve to space the shell 8 from the wall of the recess 4 in the bowl and an air jacket is in this manner formed between the shell and bowl wall and the upper and lower flanges 5 and 6. The shell 8 is frictionally fitted in the subscribing flanges 5 and 6 and while it is held against accidental displacement it may be readily removed and thoroughly cleaned when desired.

From the foregoing description of the invention it will be readily understood that the smoke issuing from the tobacco burning in the shell 8 of the bowl will be to a certain extent cooled before reaching the smoker's mouth, and that also the bowl will not become so heated from the burning tobacco as to be uncomfortably hot.

Having thus described the invention what is claimed as new is:—

A pipe having a bowl formed interiorly with a recess extending entirely around the inner side of its wall, the said recess being of a height less than the height of the bowl, the bottom wall of the bowl being concave and having a smoke duct leading therefrom, and a cylindrical imperforate shell fitted within the bowl and surrounded and snugly embraced by the portions of the inner surface of the wall of the bowl at the upper and lower ends of the recess, the lower end of the shell resting upon the concave bottom of the bowl and the upper end terminating flush with the upper end of the bowl, the said shell being entirely open at both ends and interiorly free from obstruction throughout its entire height.

In testimony whereof I affix my signature in presence of two witnesses.

IRBY E. WORK. [L. S.]

Witnesses:
E. SCHMIDT,
D. B. WARD.